United States Patent [19]
Cochrane

[11] Patent Number: 4,819,906
[45] Date of Patent: Apr. 11, 1989

[54] MOLD FOR IMPROVED PRESS-ON CAP AND SEAL

[76] Inventor: Benjamin A. Cochrane, 181 Sonora Ave., Danville, Calif. 94526

[21] Appl. No.: 947,043

[22] Filed: Dec. 29, 1986

Related U.S. Application Data

[63] Continuation-in-part of Ser. No. 709,534, Mar. 8, 1985, Pat. No. 4,632,265, which is a continuation-in-part of Ser. No. 507,342, Jun. 24, 1983, abandoned.

[51] Int. Cl.⁴ .................. B29C 39/34; B29C 45/40
[52] U.S. Cl. ........................ 249/67; 249/124; 249/142; 249/144; 249/151; 249/160; 425/556; 425/577
[58] Field of Search ............... 249/122, 124, 142, 144, 249/149, 151, 161, 162, 175, 176, 160, 66 R, 67, 145; 425/542, 554, 556, 414, 444, 438, 441, 443, 577

[56] References Cited

U.S. PATENT DOCUMENTS

| | | | |
|---|---|---|---|
| 3,344,942 | 10/1967 | Hedgewick | 425/577 |
| 3,419,244 | 12/1968 | Hedgewick | 249/144 |
| 3,482,814 | 12/1969 | Hedgewick | 249/67 |
| 3,759,662 | 9/1973 | Childs et al. | 425/436 |
| 3,904,165 | 9/1925 | Denboer | 249/67 |
| 3,915,613 | 10/1975 | Ruch | 425/438 |
| 4,155,698 | 5/1979 | Aichinger | 425/556 |
| 4,519,569 | 5/1985 | Nolan | 249/66 R |
| 4,552,328 | 11/1985 | Dutt et al. | 249/67 |
| 4,610,621 | 9/1986 | Taber et al. | 249/66 R |
| 4,618,121 | 10/1986 | Conti | 249/144 |

OTHER PUBLICATIONS

Whittington, Whittington's Dictionary of Plastics, Technomics, Stamford, Conn. (1968) p. 213.

Primary Examiner—Willard E. Hoag
Attorney, Agent, or Firm—Plante, Strauss, Vanderburgh

[57] ABSTRACT

A mold to manufacture an improved press-on bottle cap is disclosed. The cap has a top disk and a thin-walled outer skirt dependent therefrom with an annular tear score line on its inside wall and a laterally projecting tear tab which permit the cap to divide into a lower portion an upper reclosure cap. An annular lip is provided about the outside wall of the cap, approximately in the middle of the reclosure cap. The lip is discontinuous with an open sector above the tear tab. The mold has its parting line in the plane of the annular lip and the lower half of the mold has a lateral cavity to form the tear tab. In this manner, a laterally offset tear tab is provided without splitting the mold cavity along an axial plane.

18 Claims, 4 Drawing Sheets

MOLD FOR IMPROVED PRESS-ON CAP AND SEAL

RELATION TO OTHER APPLICATIONS

This application is a continuation-in-part of my co-pending application Ser. No. 709,534, filed Mar. 8, 1985 now U.S. Pat. No. 4,632,265, which is a continuation-in-part of parent application Ser. No. 507,342, filed on June 24, 1983 now ABANDONED.

BACKGROUND OF THE INVENTION

1. Field of the Invention

This invention relates to a mold to manufacture an improved bottle cap and, in particular, to a mold with a cavity which is split only in the plane of the cap and not in an axial plane.

2. Brief Statement of the Prior Art

Plastic caps for narrow-necked bottles and containers such as the ubiquitous dairy plastic container are typically of press-on or screw type. The press-on caps used heretofore have an inner or corking skirt dependent from the underside of the top disc of the cap. This corking skirt is received within the neck of the container and the cap is secured about the neck which is thus received between its inner, corking skirt and the outer capping skirt. The outer skirt commonly bears two annular ribs or beads about its inner periphery, axially positioned to be received in annular grooves in the neck finish of the container, and has two parallel score lines between the two annular beads to form a tear band. The tear band construction and upper and lower annular beads has been claimed by its manufacturers as "tamper-proof". The tamper-proof objective, however, has not been achieved. Most press-on caps can be removed without removing the tear bands, with varying difficulty, depending on the design. This shortcoming is inherent in their design, since the caps must be sufficiently elastic to stretch and permit the annular beads to seat in the annular grooves of the bottle neck during the capping operation. A simple application of a sufficient unseating force will remove the entire cap, which when reseated, offers no clue that the container was previously opened.

Recent events in the pharmaceutical industry have underscored the necessity for more secure closures, i.e., for a truly tamper-proof closure, which can also be applied to the dairy, drink and food industries.

Another difficulty commonly experienced with the press-on caps is the lack of precise tolerance in the manufacture of the caps and/or the neck finish of the plastic container. The plastic containers are blow-molded and the neck finish is achieved with dies commonly referred to as shear steel and neck rings. With frequent or prolonged use, the close tolerances of these dies can be lost with the result that the thicknesses of the neck walls can vary significantly from the original specifications. Furthermore, lack of precise control in manufacturing of the caps frequently results in caps in which the tolerances are not carefully controlled. Difficulties are experienced in the capping operations from both of these causes, and are aggravated by the trend to very light-weight plastic dairy containers, such as the 50-gram gallon container. To illustrate, flashing is trimmed from the neck of the containers during their manufacture and, sometimes, this trimming is imperfect so that necks are obtained which are not perfectly in round or in which the flashing is not completely removed. The result of these fabrication errors is that the container neck frequently wedges between the inner and outer skirts of the cap, lifting the cap or preventing the cap from securely seating.

Another difficulty which is experienced with the center corking skirt of the conventional press-on cap is that the lack of flexibility of the corking skirt prevents its use for capping of glass bottles which lack precise tolerances in neck thicknesses.

While the center, corking skirt was envisioned as sealing the caps on the containers such as blow-molded dairy containers and the like, in practice, little or no sealing is actually effected by this corking skirt. Furthermore, the edge of the container that bears against the corking skirt is very narrow and no significant sealing surface is presented, even under ideal manufacturing conditions. In practice, the variations in tolerances of the cap and/or molded plastic bottle prevent even minimal sealing between these members. As a result, the sought-after sealing of caps in containers such as plastic dairy bottles has not been achieved with press-on caps.

Manufacturers of press-on caps have also avoided split cavity molds, i.e., molds which split along axially to the plane of the cap, because of their greater complexity and cost. Consequently, the tab on the tear band of the cap of one manufacturer is formed on the lower edge of the cap skirts, resulting in a spiral tear band, as in U.S. Pat. No. 3,338,446. Caps of this design, however, are prone to split during the capping operation. Other manufacturers have avoided the splitting problem with entirely annular tear bands having lateral tear tabs however, this cap does not have an annular lip on its reclosure cap, and for this reason is inconvenient to the consumer. In my prior patents, U.S. Pat. No. 4,032,029, I disclosed a cap with an annular tear band and tab, and an annular lip. While this cap was a substantial improvement over the aforementioned caps, its manufacturing required the use of a split cavity mold, and it also utilized the less than ideal center corking skirt.

BRIEF DESCRIPTION OF THE INVENTION

This invention comprises a mold to manufacture a press-on dairy cap having an annular tear band with a lateral tear tab and an annular lip on its reclosure cap, all located in sufficient proximity to permit its manufacture without using a mold which splits along an axial plane. Preferably the cap incorporates a thin compressible plastic sealing member. The sealing member is in the form of a disk or gasket which is received beneath the undersurface of the cap.

The cap produced by the mold of the invention comprises a top disk and a single downwardly dependent skirt. The skirt is a thin-walled skirt which is integrally attached to the disk and extends perpendicularly thereto. The skirt is scored and weakened along at least one annular score line downwardly spaced from the disk, thereby forming a weakened tear line about the skirt, which divides the cap into a lower ring and a reclosure cap. An annular lip is formed near the lower edge of the reclosure cap and a tear tab is attached to the lower portion of the skirt, beneath the score line, and extends outwardly from the outer skirt, preferably radially outwardly. The annular lip is discontinuous with an open sector immediately above the tear tab.

Two narrow radial beads are provided which extend circumferentially about the inside of the skirt. These beads seat into annular grooves in the neck of the bottle.

The mold of the invention is a multiple, integral-cavity mold having special features to form a cap with a lateral tear tab located closely beneath the annular lip of the reclosure cap. The mold parts into two halves along the plane of the annular lip and the lower mold half has a laterally offset cavity to form the tear tab.

BRIEF DESCRIPTION OF THE DRAWINGS

The invention will be described with reference to the drawings of which.

DETAILED DESCRIPTION OF THE INVENTION

Figure 1:
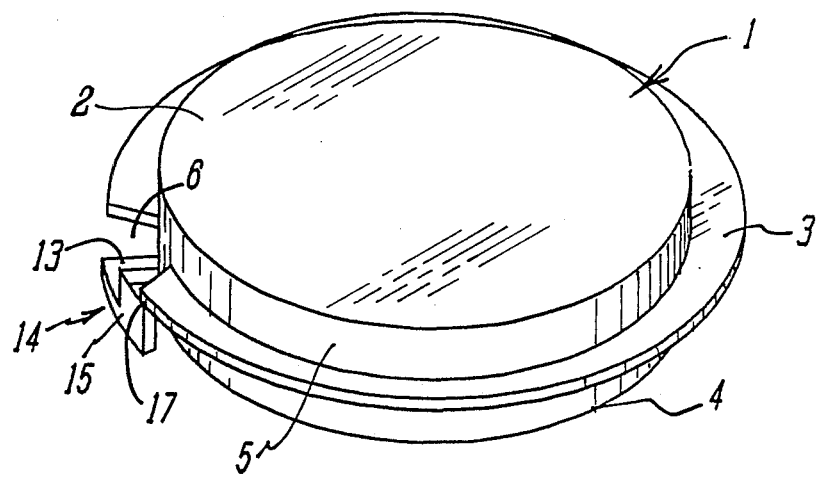
FIG. 1 is a perspective view of the press-on cap which is produced by the mold of the invention.
Figure 2:
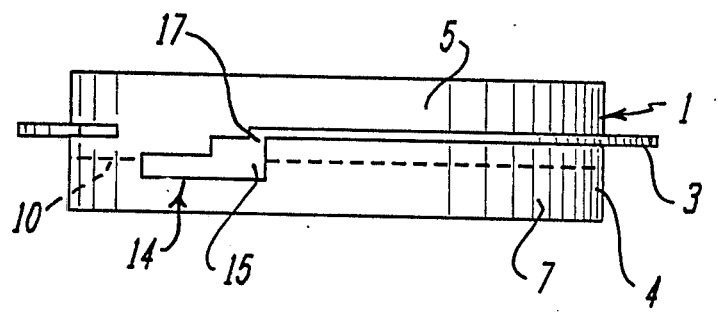
FIGS. 2-4 are side elevational views of the cap.
Figure 3:
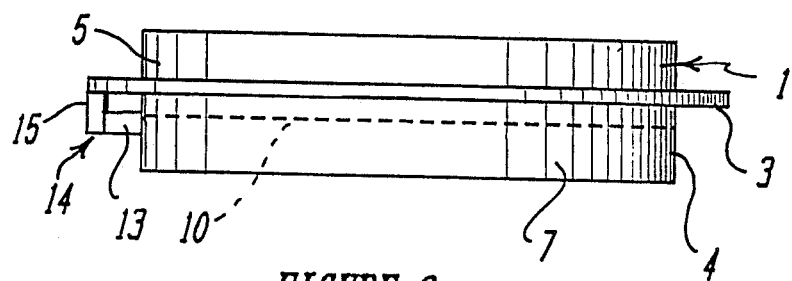
Figure 4:
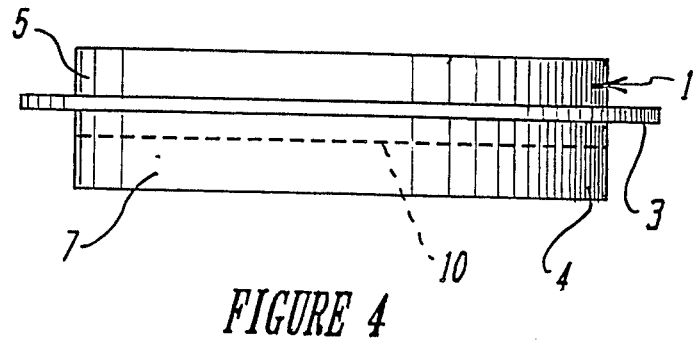

When references are made to the accompanying drawings the similar characters of reference represent corresponding parts in each of the several figures.

The cap 1 shown in FIGS. 1-4 is constructed in accordance with the present invention from a resilient and moderately flexible plastic substance that will deform slightly to snap on and snap off a container. Exemplary plastic materials which may be employed include polyethylene, polystyrene, polyvinyl chloride, polyacrylates, polyamides, polypropylene, etc. The preferred plastics are polyethylene and polystyrene.

Cap 1 has three main structural elements, a top disk 2, a single downwardly dependent skirt 4, and a partial annular lip 3 about its upper portion 5. The upper portion 5 is divided from the lower portion 7 of the cap 1 by an annular score line 10 which extends about the inner surface of skirt 4. The top disk 2 is preferably a flat circular plate having a flat bottom and a substantially planer exterior surface. The flat exterior surface provides a convenient place for labels or instructional material. While the disk can have a shape other than circular such as rectangular, oval, etc., the circular shape is preferred. The annular lip 3 extends beyond the skirt a slight distance to provide a convenient grasping tab for the removal of the upper portion 5 of the cap from the container once it has been separated from the lower portion of the cap. As illustrated, lip 3 is discontinuous in the area 6, immediately above tear tab 14. A greater portion of lip 3 can be omitted, if desired, provided a sufficient area is present to permit one to lift up on the cap with one's fingers or thumb. Thus, the consumer, after removing the lower portion of the cap, can open the container by applying pressure upwardly on the lip 3 by a thumb or finger. This section will unseat an upper bead in the top portion 5 of the cap from a mating upper groove of the container neck, and allow the cap to slide off the container neck in the manner described hereinafter. The tear tab 14 has a radial leg 13 which is integral with the skirt 4 and also integral with a lateral leg 15.

Leg 13 has sufficient height to provide the necessary strength to prevent it from being torn from the cap when it is pulled. If desired, it can be the same width as the width of the lower portion of the cap, i.e., from the internal score line 10 to the bottom edge of the cap. Preferably, however, it is slightly less in width, e.g., from about 0.125 to about 0.2 inch. Preferably, the end of leg 15 is of slightly greater height than leg 13 (see FIG. 2), and extends up to the level of the annular lip 3. In the most preferred embodiment (which is illustrated in FIGS. 1-4), the leg 15 extends to the undersurface of lip 13 which overlaps the top edge of leg 15 a sufficient distance to form a thin web 17 which provides an integral connection between lip 3 and leg 15. The thickness of this web is minor, e.g., about 0.05-0.1 inch, and is sufficient to stabilize the leg 15 and prevent it from spreading outwardly after manufacture. The web is sufficiently thin, however, that it readily breaks when a consumer pulls on leg 15 to open the cap.

Figure 5:
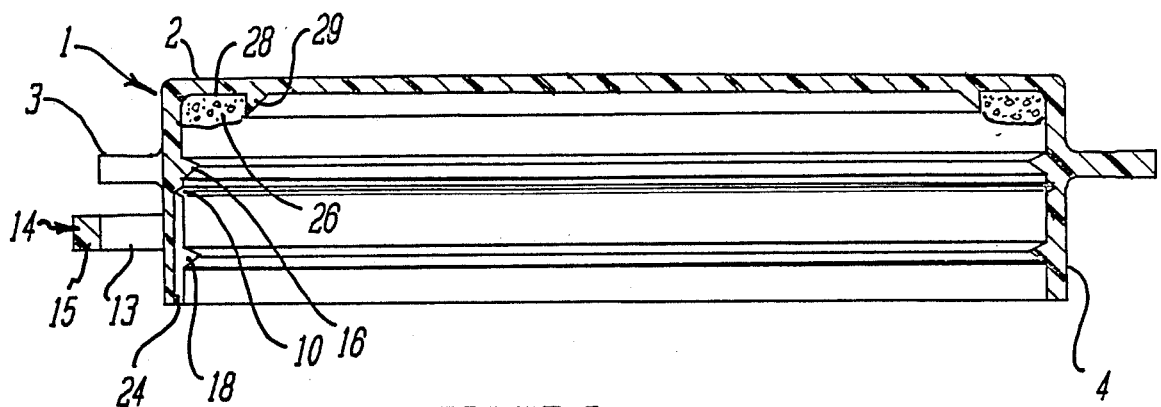
FIG. 5 is an elevational sectional view of the cap of FIG. 1.

Referring now to FIG. 5, the skirt 4 of cap 1 is integrally attached to the top disk 2 and extends substantially perpendicularly from the undersurface of the disk. The skirt 4 is a thin-walled cylindrical shell and is composed of the thin shell, an annular score line 10, tear tab 14, an upper circumferential bead 16 and a lower circumferential bead 18. The sectional view of FIG. 5 is taken along a line which passes through a vertical groove 24 in skirt 4 which extends from the annular score line 10 to the bottom edge of the skirt. This groove 24 is immediately adjacent to radial leg 13 and is behind the leg 13, i.e., lying inside of lateral leg 15. The vertical groove 24 has a depth substantially equal to the depth of score line 10, and forms a weakened vertical line which will tear when the tear tab 14 is pulled, thereby insuring complete removal of the lower portion of the cap from the container.

The beads 16 and 18 are substantially uniform raised surfaces projecting inwardly from the skirt. The beads may be continuous about the entire periphery of the inner wall of skirt 4 or, alternatively, may be discontinuous. The cross-sections of the beads can be semi-circular, however, they are preferably triangular with inclined sidewalls, as shown in FIG. 5. The triangular shape of these beads is preferred for ease in capping, removal and re-application of the cap since the inclined surfaces of the triangular cross-sectional beads transmit axial force applied to the cap in an outward, radial direction thereby urging the grooves to seat or unseat from the grooves in the neck finish of the container. The inclined sidewalls also facilitate manufacture in ease of ejection of the caps from the molds used to fabricate the caps.

Received within the cap is a compressible gasket 26 which is formed of suitable compressible plastic such as polyethlene, polyurethane, polystyrene, etc. A suitable material is a thermoplastic hot meld having a high elasticity. An example of a commercially available material is product S-314-434A from Bostik which has about 520 percent elongation at break point and a tensile strength of about 140 psi. This material can be applied in a foamed or unfoamed state. Other plastic foams can be used and are preferably of low density, e.g., about 0.5 to about 2 pounds per cubic foot. The gasket 26 is relatively thin, e.g., from about 0.1 to about 0.25 inch, preferably from about 0.1 to about 0.125 inch in thickness. The gasket is formed of plastics which are resistant to liquid permeation, and when used in a foamed state, the foams are formed of closed cells, to be impermeable to liquids.

The gasket 26 can be formed during the formation of the cap, and for this purpose, a polyolefin liquid resin, which cures to a polyolefin foam can be injected into the mold cavity as a preliminary step to the injection molding of the caps. Once the polyolefin foam is injected and the foam gasket 26 is formed, the injection molding of the cap proceeds with the formation of a cap having a firmly bonded gasket 26 on its undersurface. The gasket 26 can be subsequently formed or bonded to the undersurface of cap 26, either by bonding a preformed and precut gasket 26 or by applying the liquid plastic onto the previously formed cap. This is the preferred application with the hot melt gasket material previously described.

Preferably, the undersurface of cap 1 has an annular, raised rim 29 about its periphery, to provide an annular recess 28 which is filled by gasket 26, thus avoiding the application of the gasket material across the entire undersurface of cap 1.

The thickness of the skirt is not critical to the practice of this invention as long as the cap is sufficiently resilient to allow the internal beads 16 and 18 to expand over the wide areas of the container neck and snap into the container grooves without tearing the cap or container. Generally, however, the skirt thickness is governed by economics with the thinnest walled functional cap being preferred. Usually, the skirt will have a thickness ranging from 0.3 to 1.5 millimeters and more usually from 0.5 to 1.2 millimeters.

The annular score line 10 extends about the inside wall of skirt 4. Preferably it is a triangular shaped groove, i.e., a V-groove which extends approximately 0.15 to 0.5 the wall thickness of skirt 4. The score line separates the cap into an upper, reclosure member 5, and a lower portion, which is discarded when the cap is opened.

A lateral tear tab 14 is attached to the cap immediately beneath annular score line 10 to provide a means for the user to tear the lower portion from the cap. The tear tab 14 may be any laterally projecting tab which permits the consumer to easily grasp it. In a preferred embodiment, the tab 14 has a leg 13 which extends laterally outwardly from the cap skirt 4 and a lateral leg 15 which extends circumferentially, parallel to the skirt 4; see FIGS. 1 and 2. The tab 14 is preferably of greater width than leg 13 for ease in grasping the tab and projects slightly above the score line 10. In order to increase the friction between the fingers and the tear tab, the tab can be provided with serrated grooves or the like (not shown).

A weakened area or groove 24 extends axially on the inside wall of skirt 4, from the lower score 12 to the bottom edge of the cap, substantially adjacent to tear tab 14. The weakened area is provided so that the lower portion of the cap may be separated and removed form the container and discarded when the cap is opened. Preferably, this weakened area is a score line 24 having substantially the same cross section as the annular score line 10.

Figure 6:
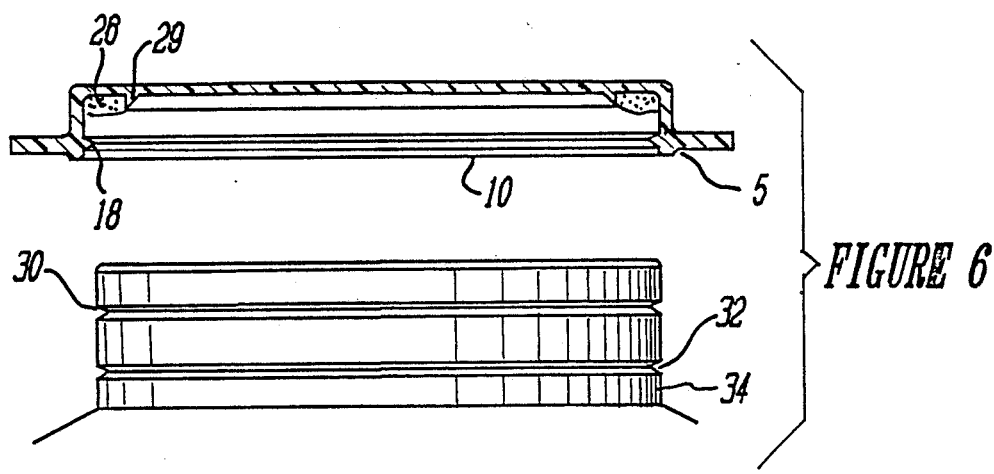
FIG. 6 is an exploded view of the reclosure cap above a bottle after removal of the tear band.

FIG. 6 shows the bottle neck 34 with the upper cap portion 5 removed. The lower portion 7 of the cap has been removed and discarded. The container neck finish includes annular grooves 30 and 32 which receive, respectively, beads 16 and 18 of cap 1. Bead 16 is in the inside wall of upper cap portion 5, and functions by reseating in groove 30 of bottle neck 34. The upper bead 16 is disposed above the annular score line 10, between score line 10 and the undersurface of disk 2.

When the cap is seated on the container with its annular beads 16 and 18 received within the annular grooves 30 and 32 of the neck finish, the container neck 34 compresses the gasket 26, thus insuring sealing of the contents of the container.

Figure 7:
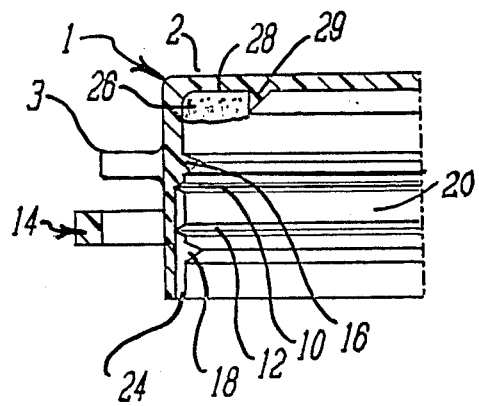
FIG. 7 is a portion of an elevational sectional view of an alternative cap having two score lines with an annular tear band.

Referring now to FIG. 7, an alternative cap construction will be described. As there illustrated, the cap is substantially identical to that illustrated in FIGS. 1–6, however, the cap of FIG. 7 has two annular score lines; an upper score line 10 and a lower score line 12 which are identical and extend circumferentially about the inside wall of skirt 4. Preferably they are triangular shaped grooves, i.e., V-grooves which extend approximately 0.15 to 0.5 the wall thickness of skirt 4. That portion of the skirt between score lines 10 and 12 constitutes a tear band 20. This tear band is removed when the consumer opens the container and, after it is removed from the cap, it can be discarded. Since it is to be discarded, it is preferable to make the band as narrow as possible without weakening the band to a point where it could break during removal. Generally the tear band wil range in width from 2 to 10 millimeters. In this application, the lower portion 7 of skirt 4 is a ring beneath the lower score line 12. This ring remains about the bottle neck after the tear band has been removed. The lower annular bead 18 which is disposed below the second score line 12 remains with the lower portion 7. When this embodiment is used, the lower portion 7 of the cap can be bonded to the container neck, with suitable adhesives, or by thermal or ultrasonic bonding techniques. For this purpose, the skirt 4 can be made wider than shown with the cap of FIGS. 1–6 to provide a greater annular area for bonding between the container neck and the cap.

Figure 8:
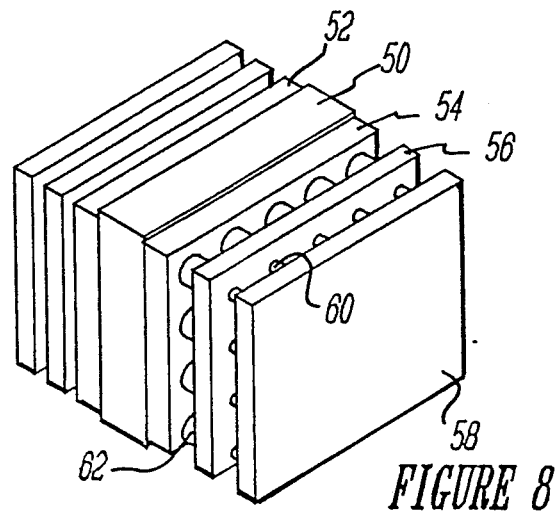
FIG. 8 is a perspective view of a mold of the invention.

Referring now to FIG. 8, the mold and its operation for the production of the caps of this invention will be described. The caps are preferably made by injection molding and the mold described hereinafter is intended for this manufacturing method. As illustrated in FIG. 8, the preferred mold is of the construction known in the industry as a stacked mold in which a stationary center die plate 50 is used with movable, outer die plates 52 and 54. Each assembly of outer die plates includes independently movable core plates such as 56 and runner plates such as 58. A plurality of runners or pins 60 project inwardly from runner plate 58 and a plurality of cores 62 also project inwardly from core plate 56, concentric with runners 60.

Figure 9:
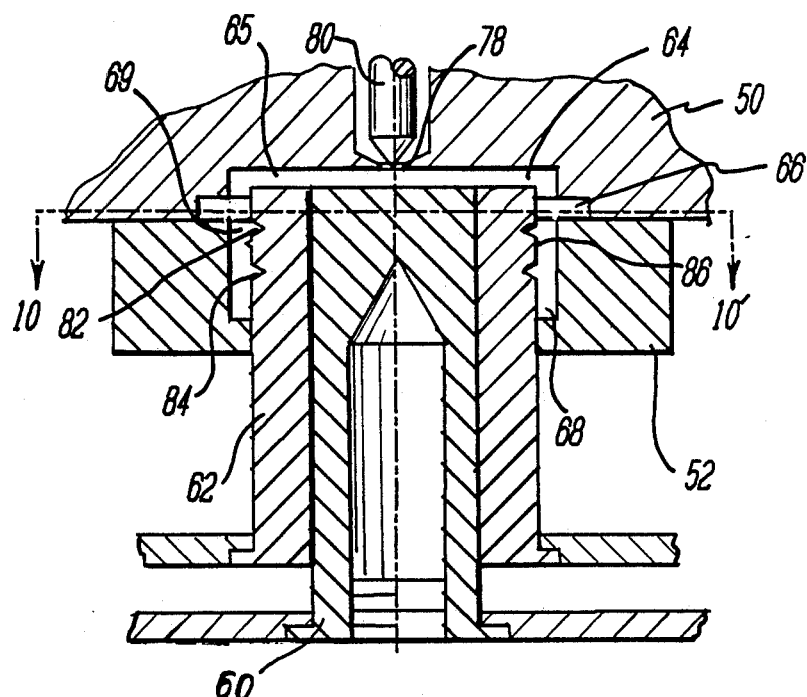
FIG. 9 is a view along line 9—9 of FIG. 8.

The construction and operation of the mold of the invention will be more apparent from the illustration of FIG. 9 which is a sectional view through a single mold cavity. The center die plate 50 is shown with a cylindrical recess 64 and a surrounding annular recess 66. The cylindrical recess 64 corresponds in depth to the height of the reclosure cap 5 above its annular lip 3 and the annular groove 66 corresponds in width and thickness to the lip 3 of the cap. This recess is coaxial with a cylindrical bore 68 in the outer die plate 52 which has a depth corresponding to the width of the skirt 4 of the cap beneath its lip 3.

Core 62, at preselected locations, is provided with upper annular groove 82 and lower annular groove 84 to form annular beads 16 and 18. These grooves can be discontinuous to provide discontinuous beads about the periphery of inside wall of cap 1. A triangular shaped groove 79 in core 62 forms rim 29 on the undersurface of cap 1.

As previously mentioned, at least one annular score line is molded into the cap to provide an annular tear line to separate the top portion 5. The annular score line is provided by the annular bead 86 which is located on core 62, between the upper annular groove 82 and lower annular groove 84. The bead 86 extends into the annular cavity 69 between the core and cylindrical recess 68 of the outer mold plate 52. Location of the score line on the inside wall of the cap 1 avoids the need to use molds which split in a plane axial to the cavity. When the mold is to prepare the cap of FIG. 7, a second annular bead (not shown) identical to bead 86 is located below the bead 86 and immediately above lower annular groove 84.

Molten polymer is injected into the upper flat cavity 65 through passageways of the stationary die plate 50, and flows downwardly filling cavity 69. This is illustrated in FIG. 9 by the small orifice 78 which communicates between the mold cavity 65 and passageway 76. Flow through this passageway is controlled by valve member 80 which is operative to open and close orifice 78 at preselected times during the molding cycle.

Figure 10:
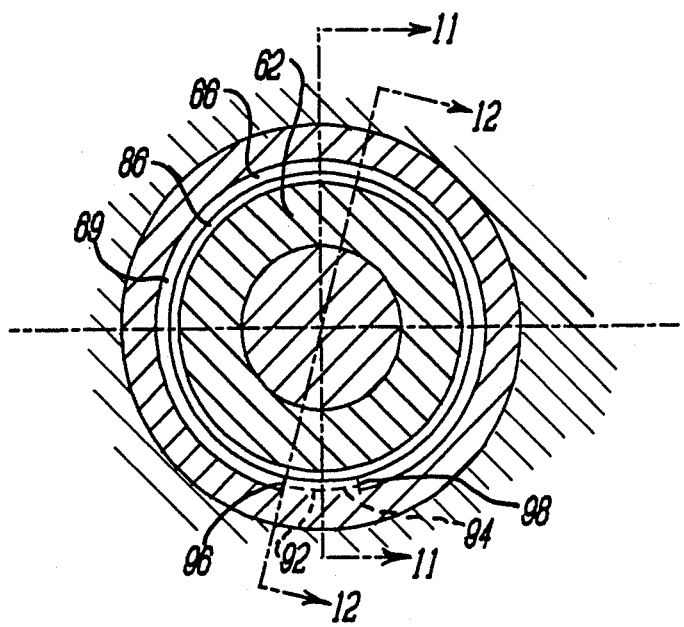
FIG. 10 is a view along line 10—10 of FIG. 9.

FIG. 10 shows a sectional view along lines 10-10' of FIG. 9. As previously mentioned, cylindrical recess 64 in plate 52 is surrounded by an annular groove 66. The upper end of core 62 is concentrically received within the cylindrical recess 64 providing the annular cavity 69 of the mold. The annular bead 86 extends into, but not entirely across this cavity 69.

Preferably, the annular groove 66 is discontinuous walls 96 and 98, thereby forming a solid web. Immediately beneath this web, the outer cavity plate 52 has an arcuate cavity 92 with a width slightly less than the width of the annular recess 66 and a length substantially equal to the length of web 90. This annular recess, however, is slightly offset from web 90 by a slight distance 94 which can be from about 1/16 to about ¼ inch.

Figure 11:
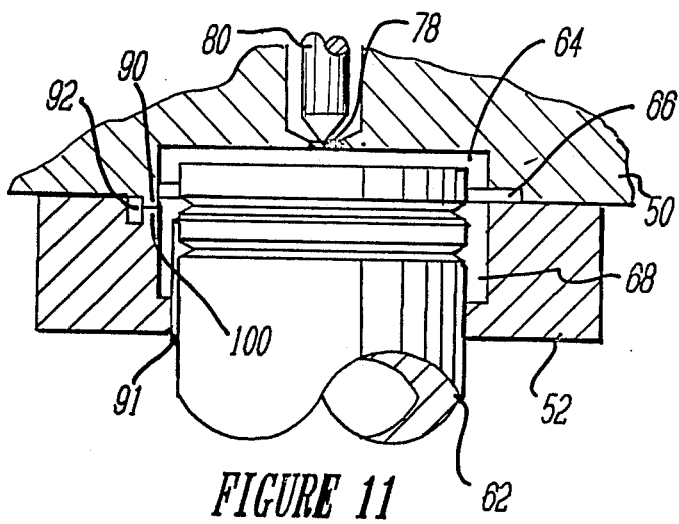
FIG. 11 is a view along line 11—11 of FIG. 10.

The configuration of the cavity 92 is more apparent from FIG. 11, which is an elevational sectional view along lines 11-11' of FIG. 10. This shows the web portion 90 of stationary cavity plate 50 meeting the outer cavity plate 52. Cavity 92 is recessed into outer cavity plate 52, laterally offset from the bore 66 a slight distance to provide the intermediate wall 100 that extends upwardly to abut the undersurface of web 90 of stationary mold plate 50. The cavity 92 forms the tear tab 14 of cap 1. The core 62 has a rib 91 which extends axially along the side of the core. This rib is of triangular cross section to form the aforementioned vertical score line 24 in the cap. The receiving bore in plate 52 has a keyway of the same shape and size to permit sliding reception of the core 62.

Figure 12:
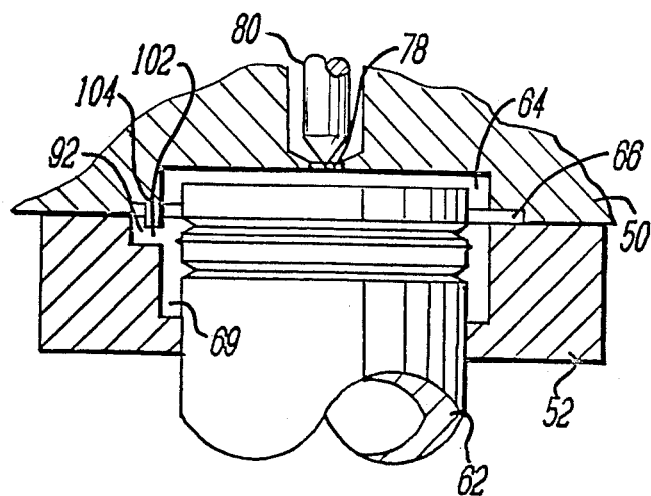
FIG. 12 is a view along line 12—12 of FIG. 10.

FIG. 12 illustrates an elevational sectional view of the mold cavity along line 12-12' of FIG. 10. As there illustrated, the intermediate wall 100 (shown in FIG. 11) is open to provide a passageway 102 communicating between cavity 92 and the annular cavity 69. The annular groove 66 in the stationary plate extends to cavity 92 to provide the aforementioned thin web 17 between the annular lip 3 which is formed in annular groove 66 and the top edge of the tear tab, which is formed in cavity 92. The stationary mold plate 50 also has an arcuate tab 104 that projects into opening 102, reducing the width of this opening to correspond to the width of the radial leg 13 of the tear tab.

In operation, the outer cavity plates 52 are pressed against the opposite faces of the stationary mold plate 50 and the cores 62 are fully advanced into the outer mold plates 52 by compression of the core plates 56. The ejectors 60 are located at their position shown in FIG. 9 with their end surfaces flush with the surrounding ends of cores 62. The mold plate 50 which has been preheated with suitable heating means such as electrical conductors and the like is supplied with molten molding resin such as low density polyethylene through a supply conduit, not shown. Passageways internal of the mold plate 52 communicate with the mold feeder passageways 76 to supply the molding resin at a high pressure, e.g., 2000 to about 3500 psig., into the mold cavity. The molding resin is injected into the mold cavity by retraction of the valve member 80. When the cavity is filled, valve member 80 closes. The mold plates 50 and 52 are cooled sufficiently about the mold cavity by heat exchange with a cooling fluid so that the molten plastic gels after it is injected into the mold cavity. For this purpose, plates 50 and 52 have internal passageways, not shown, for circulation of a heat exchange fluid. Once the plastic within mold cavity 65 gels and begins to solidify, the plates 52, 56 and 58 are retracted from stationary plate 50. The outer cavity plate 52 is also retracted from its position relative to core 62, leaving formed caps on the ends of each of the cores 62. Once the outer cavity plate 52 has cleared the lower ends of the caps formed on the cores 62, the ejectors 60 are moved forward, past the ends of the cores 62, lifting the formed caps from their cores 62.

Although the invention has been illustrated with reference to mechanically actuated ejectors 60 for ejection of the molded caps, this function can equally be accomplished by discharging a compressed fluid such as compressed air through valve passageways in cores 62 when it is desired to eject these caps.

The caps of the invention are thus capable of manufacture without the use of split-cavity molds, i.e., cavities split along the longitudinal axis of the mold cavity. The caps, however, are provided with annular lips 3 and immediately subjacent thereto, laterally projecting tear tabs 14. The tear tabs preferably have a sufficient width to provide adequate surface for grasping by the user. The cap of this design thus provides reclosure caps 5 and annular skirts 4 of maximum height. Since the annular lips 3 are located substantially across from the inner beads 16 of the reclosure cap, these lips are at their most effective position for removal of the closure caps with the application of an upward pressure. Additionally, the location of the annular lips at this position permits the tear tabs 14 to be tacked to the lips at their trailing end, a construction which insures that the caps will feed smoothly through cap chutes and conveyors of the recapping machine.

The embodiment of the cap which is shown by FIGS. 1-6 is ideally suited for beverage containers such as milk bottles and fruit drinks. The embodiment of the cap shown by FIG. 7 is useful for pharmacueticals as the lower portion of the skirt can be bonded by cement or solvent or welded by termal or ultrasonic radiation to the container, thereby insuring a positive seal for the contents of the container.

The invention has been described with reference to illustrated and presently preferred embodiments. It is not intended that the invention be unduly limited by this disclosure of preferred embodiments. Instead, it is intended that the invention be defined by the means, and their obvious equivalents, set forth in the following claims.

What is claimed is:

1. A mold for forming a plastic cap having an annular tear band with a laterally offset tear tab dependent from said tear band which comprises:
   a. an upper half cavity member with a first cylindrical recess surrounded by a shallow, discontinuous annular recess;
   b. a lower half cavity member with a second cylindrical recess having a diameter equal to the diameter of the first cylindrical recess and mating on a parting plane with said upper half cavity member to form a cylindrical mold cavity;
   c. a core member slidably received in said lower half cavity member to form said mold cavity with a thin circular cavity and a thin annular cavity in open communication therewith;
   d. a laterally offset cavity in said lower half cavity member, open to said parting plane and separated from said second cylindrical recess by a discontinuous wall, thereby providing open communication between said recess and said laterally offset cavity;
   e. a central bore in said core member; and
   f. ejector means slidably received in said central bore, and operable to eject a plastic cap from said lower half member of said mold.

2. The mold of claim 1 wherein said half cavity members are movable axially to close on said parting plane and form said cavity and to part from said parting plane and permit ejection of molded caps therefrom.

3. The mold of claim 1 including annular bead means about said core member to form at least one weaken score line on the skirts of caps formed in said mold.

4. The mold of claim 3 including a pair of spaced apart beads about said core member to form annular tear bands in the skirts of caps formed in said mold.

5. The mold of claim 3 wherein said annular bead means has a triangular cross section.

6. The mold of claim 1 including annular groove means about said core member to form annular beads on the inside walls of the skirts of caps formed in said mold.

7. The mold of claim 1 including a pair of spaced annular grooves about said core member to form a pair of spaced apart annular beads on the inside walls of the skirts of caps formed in said mold.

8. The mold of claim 1 including a pair of spaced apart annular grooves about said core member to forme a pair of spaced apart annular beads on the inside walls of the skirts of caps formed in said mold, each groove having a triangular cross section.

9. The mold of claim 4 wherein said laterally offset cavity has a depth sufficient to locate its bottom wall opposite the lowermost of said beads when said core member is fully advanced in said cavity.

10. The mold of claim 1 including means to supply molten thermoplastic to said cavity.

11. The mold of claim 1 wherein said core member is slidably received within said cavity to retract from a plastic cap after formation of said cap.

12. A mold for forming a plastic cap having an annular tear band with a laterally offset tear tab dependent from said tear band which comprises:
   a. an upper half cavity member with a first cylindrical recess surrounded by a shallow, discontinuous annular recess;
   b. a lower half cavity member with a second cylindrical recess having a diameter equal to the diameter of the first cylindrical recess and mating on a parting plane with said upper half cavity member to form a cylindrical mold cavity;
   c. a core member slidably received in said lower half cavity member to form said mold cavity with a thin circular cavity and a thin annular cavity in open communication therewith;
   d. a laterally offset cavity in said lower half cavity member, open to said parting plane and separated from said second cylindrical recess by a discontinuous wall, thereby providing open communication between said recess and said laterally offset cavity; and
   e. ejector means carried by said core member and operable to eject a plastic cap from said lower half member of said mold.

13. The mold of claim 12 wherein said half cavity members are movable axially to close on said parting plane and form said cavity and to part from said parting plane and permit ejection of molded caps therefrom.

14. The mold of claim 12 including annular bead means about said core member to form weaken score lines on the skirts of caps formed in said mold.

15. The mold of claim 12 including a pair of spaced apart beads about said core member to form annular tear bands in the skirts of caps formed in said mold.

16. The mold of claim 12 wherein said laterally offset cavity has a depth sufficient to locate its bottom wall opposite the lowermost of said beads when said core member is fully advanced in said cavity.

17. The mold of claim 12 including means to supply molten thermoplastic to said cavity.

18. The mold of claim 12 wherein said ejector means is slidably received within a bore in said core member to eject a plastic cap after formation of said cap.

* * * * *